US007828651B2

(12) United States Patent
Oles et al.

(10) Patent No.: US 7,828,651 B2
(45) Date of Patent: Nov. 9, 2010

(54) GAMING MACHINE INCLUDING SECURITY DATA COLLECTION DEVICE

(75) Inventors: David Matthew Oles, Henderson, NV (US); Steven G. LeMay, Reno, NV (US); Bhakta Rakesh, Henderson, NV (US)

(73) Assignee: IGT, Reno, NV (US)

( * ) Notice: Subject to any disclaimer, the term of this patent is extended or adjusted under 35 U.S.C. 154(b) by 4 days.

(21) Appl. No.: 10/660,879

(22) Filed: Sep. 10, 2003

(65) Prior Publication Data

US 2004/0048661 A1 Mar. 11, 2004

Related U.S. Application Data

(62) Division of application No. 09/957,805, filed on Sep. 21, 2001, now Pat. No. 6,641,484.

(51) Int. Cl.
*A63F 13/00* (2006.01)

(52) U.S. Cl. .......................................... 463/29; 463/47

(58) Field of Classification Search ............. 463/40–42, 463/30–38, 29; 235/379–380, 38; 382/115–116, 382/209

See application file for complete search history.

(56) References Cited

U.S. PATENT DOCUMENTS

| | | | | |
|---|---|---|---|---|
| 4,357,015 | A | 11/1982 | Santora et al. | |
| 4,688,105 | A | 8/1987 | Bloch et al. | |
| 4,710,873 | A | 12/1987 | Breslow et al. | |
| 4,821,118 | A * | 4/1989 | Lafreniere | 348/156 |
| 5,012,522 | A * | 4/1991 | Lambert | 382/118 |
| 5,179,517 | A * | 1/1993 | Sarbin et al. | 463/25 |
| 5,253,167 | A * | 10/1993 | Yoshida et al. | 705/43 |
| 5,258,837 | A * | 11/1993 | Gormley | 348/441 |
| 5,278,643 | A | 1/1994 | Takemoto et al. | |
| 5,283,644 | A * | 2/1994 | Maeno | 348/152 |
| 5,386,103 | A * | 1/1995 | DeBan et al. | 235/379 |
| 5,397,133 | A | 3/1995 | Penzias | |
| 5,432,864 | A * | 7/1995 | Lu et al. | 382/118 |

(Continued)

FOREIGN PATENT DOCUMENTS

JP 7-152977 6/1995

(Continued)

OTHER PUBLICATIONS

New York. State of New York Banking Department. Article II-AA ATM Safety Act. Jun. 21, 1995. Dec. 20, 2006 <http://www.banking.state.ny.us/legal/atmsafe.htm>.*

(Continued)

*Primary Examiner*—John M Hotaling, II
(74) *Attorney, Agent, or Firm*—Weaver Austin Villeneuve & Sampson LLP

(57) ABSTRACT

A gaming machine includes at least one security data collection device. In one embodiment, the security data collection device is a camera mounted to the gaming machine and adapted to collect image information regarding events associated with or adjacent to the gaming machine, such as the image of a player. In one embodiment, a player's image is stored in data form on a player card. When the player plays a gaming machine, the player's image is capture and compared to the image stored on the player card for authentication purposes.

28 Claims, 4 Drawing Sheets

U.S. PATENT DOCUMENTS

| | | | | | |
|---|---|---|---|---|---|
| 5,483,069 | A | * | 1/1996 | Kofune et al. | 250/341.8 |
| 5,519,669 | A | | 5/1996 | Ross et al. | |
| 5,530,438 | A | * | 6/1996 | Bickham et al. | 340/5.8 |
| 5,594,806 | A | * | 1/1997 | Colbert | 382/115 |
| 5,595,289 | A | | 1/1997 | Kurek et al. | |
| 5,595,389 | A | * | 1/1997 | Parulski et al. | 463/31 |
| 5,634,639 | A | | 6/1997 | Tokito et al. | |
| 5,745,160 | A | | 4/1998 | Ishida et al. | |
| 5,801,766 | A | * | 9/1998 | Alden | 348/157 |
| 5,839,956 | A | * | 11/1998 | Takemoto | 463/25 |
| 5,850,352 | A | | 12/1998 | Moezzi et al. | |
| 5,867,821 | A | | 2/1999 | Ballantyne et al. | |
| 5,884,913 | A | | 3/1999 | Cohen | |
| 5,957,776 | A | | 9/1999 | Hoehne | |
| 5,984,780 | A | * | 11/1999 | Takemoto et al. | 463/20 |
| 6,014,594 | A | | 1/2000 | Heidel et al. | |
| 6,019,369 | A | | 2/2000 | Nakagawa et al. | |
| 6,068,184 | A | * | 5/2000 | Barnett | 235/379 |
| 6,072,523 | A | | 6/2000 | Zajfman et al. | |
| 6,120,379 | A | | 9/2000 | Tanaka et al. | |
| 6,125,307 | A | | 9/2000 | Heidel et al. | |
| 6,128,550 | A | | 10/2000 | Heidel et al. | |
| 6,135,884 | A | | 10/2000 | Hedrick et al. | |
| 6,142,876 | A | * | 11/2000 | Cumbers | 463/25 |
| 6,152,450 | A | | 11/2000 | Boudreaux et al. | |
| 6,205,716 | B1 | | 3/2001 | Peltz | |
| 6,304,290 | B1 | | 10/2001 | Bailly | |
| 6,317,152 | B1 | | 11/2001 | Hobson et al. | |
| 6,328,208 | B1 | * | 12/2001 | Artino et al. | 235/379 |
| 6,351,552 | B1 | | 2/2002 | Weaver et al. | |
| 6,460,848 | B1 | * | 10/2002 | Soltys et al. | 273/149 R |
| 6,583,813 | B1 | * | 6/2003 | Enright et al. | 348/150 |

FOREIGN PATENT DOCUMENTS

| | | |
|---|---|---|
| JP | 7-289719 | 11/1995 |
| JP | 7-328216 | 12/1995 |
| JP | 2000-113293 | 4/2000 |
| JP | 2000-218045 | 8/2000 |

OTHER PUBLICATIONS

Author Unknown, “MGM, Silicon Team Up on Game,” Slot Manager, Jul. 2000, Front Cover and p. 6.

Australian Office Action dated Sep. 19, 2008 issued in 2007201373 (IGT1P496AUD1).

* cited by examiner

GAMING MACHINE INCLUDING SECURITY DATA COLLECTION DEVICE

RELATED PATENT APPLICATION

This patent application is a divisional application from U.S. Ser. No. 09/957,805, filed Sep. 21, 2001, entitled GAMING MACHINE INCLUDING SECURITY DATA COLLECTION DEVICE, now U.S. Pat. No. 6,641,484.

FIELD OF THE INVENTION

The present invention relates to gaming machines, devices or systems arranged to present one or more games, and more particularly to such a gaming machine, device or system including at least one device adapted to collect security data or information.

BACKGROUND OF THE INVENTION

As is well known, there are number of reasons for maintaining strict security for a gaming machine. Players and thieves attempt to cheat gaming machines in a variety of ways to obtain fraudulent payouts or otherwise directly steal monies from these machines. Thieves attempt to alter the play of the machine, access coin or bill storage devices in the machine, and pass counterfeit bills and coins, among other things. In some instances, even gaming employees attempt to steal from a gaming machine, such as by taking monies from the machine during a coin or bill drop exchange. Gaming employees may also tamper with the internal mechanisms of the gaming machine.

Laws also generally require that a player of a gaming machine be at least 21 years old. In some instances, a player of a lesser age plays a machine and is awarded a large jackpot. To avoid not being able to collect on the jackpot, the underage player may attempt to trade places with another player of sufficient age before casino personnel arrive to verify and pay the jackpot.

Casinos employ a wide variety of security measures with respect to gaming machines. Commonly, casinos mount cameras to the ceiling of the casino. These cameras are directed at banks of gaming machines and are used to monitor those machines. Casinos may also employ roving personnel to watch players and gaming machines.

The security measures employed by casinos today have significant limitations in their effectiveness and usefulness. A method and apparatus for providing improved gaming machine security and which improves overall functionality is desired.

SUMMARY OF THE INVENTION

The present invention is a gaming machine which includes a security system. The security system includes at least one security data collection device, such as a camera for collecting image information and/or a microphone for collecting audio information regarding activities associated with the gaming machine.

In one embodiment of the invention, the gaming machine includes a housing and is arranged to present at least one game for play by a player. One or more image collection devices, such as cameras, are supported by the housing. At least one image collection device is arranged to collect image information regarding activities occurring at or associated with the exterior of the gaming machine. These images may comprise images of a player playing the gaming machine and images of use of gaming machine buttons, coin and bill acceptors and the like.

In another embodiment, at least one image collection device is associated with the gaming machine and arranged to collect image information regarding activities associated with an interior of the gaming machine. These images may comprise images of a party accessing the interior of the gaming machine via a door, one or more devices inside the gaming machine, or compartment(s) below the gaming machine.

In one embodiment, a controller is provided for controlling the one or more security data collection devices and the information collected or generated thereby. In one embodiment, the controller may comprise a master gaming machine controller which also controls various other devices of the gaming machine and facilitates the presentation of the game. The gaming machine also includes at least one information storage device. The gaming machine controller causes collected security data or information, such as collected image or audio information, to be stored at the image storage device. In one embodiment, the image information is continuously generated and stored. To limit the total information which is stored, the information stored at the information storage device may be overwritten after a period of time or after a predetermined amount of data or information is stored.

In another embodiment, the controller is arranged to cause collected security data or information to be stored and not overwritten in the event a predetermined event occurs. When a particular event occurs, collected security data or information for a period of time before and after the event is stored. The information is not overwritten until an override instruction is provided, such as after the information is obtained by gaming personnel.

In one embodiment, the gaming machine is linked with a remote security monitoring station by at least one communication or data link. In one embodiment, an analog video link is provided over which streaming image data or information collected by one or more cameras is transmitted. Audio information may also be transmitted over the same or a similar analog link. Control information may be transmitted over a separate digital link. In another embodiment, the collected security data may comprise data in digital form or comprise an analog signal converted to digital form and then transmitted over a digital link.

The remote station includes at least one display and preferably an audio reproduction device. Image information is transmitted to the remote station for viewing and/or storage. Audio information is transmitted to the remote station for play and/or storage. In one embodiment, a user of the remote station may cause the controller to transmit the image and/or audio information as it is collected for “real time” viewing or play. In another embodiment, the security data or information may automatically be sent to the remote station when one of the predetermined events occurs. In one embodiment, the analog output of several cameras is modulated and transmitted, and using a tuner the individual image output of one or more of the cameras may be continuously viewed or stored. In another embodiment, multiple digital data streams or a single data stream of packetized digital data is transmitted.

In one embodiment, the controller is associated with a peripheral device of the gaming machine, such as a player tracking device or bill validation device. The peripheral device is associated with the network or communication link. The security data collection device transmits data via this link. In other arrangements, the camera or other security data collection device may be connected to an associated device, and the communication link may be shared with the associated device or be independent of a link (if any) to which the peripheral or other associated device is connected.

A variety of features and functions are provided. Cameras may include zoom, pan, filter and other features. Collected data may be compressed or converted to reduce the amount of data which is stored or transmitted. The camera, including its various functions, may be controlled remotely, by an associated controller, a gaming controller of the gaming machine, or combinations thereof.

A variety of control features may be provided. The security data collection devices may be activated upon the occurrence of certain events, such as particular spoken words, movement or loud noises, or input to the gaming machine such as use of a stolen player card, input of counterfeit currency or input to a button. On the other hand, data from the security data collection devices need not be stored or transmitted if a level of movement below a minimum threshold is occurring, or a level of noise below a minimum noise level exists. If a particular event is detected, an alarm may be triggered. The alarm may be triggered at a remote location and the collected security data, such as an image of person attempting to pass counterfeit currency or use a card not issued to them, may be transmitted to the remote location.

In accordance with the invention, security data or information regarding activities associated with a gaming machine is obtained. This information is useful for a variety of security purposes. The purposes include identifying the player of a machine, such as the player of a machine when a jackpot is awarded. In addition, image information is obtained regarding a variety of other activities, such as attempts to tamper with the machine, and even gaming employees' attempts to take coins or cash from the inside or tamper with internal mechanisms of the gaming machine. Information may be provided regarding activities directly associated with the gaming machine and those in the vicinity, including patron traffic information during various times of day and activities at other gaming machines, such as those directly across an aisle therefrom.

In one or more embodiments, image information is used for verification purposes. In one embodiment, image information is encoded and printed on an award or cash-out ticket. The player may only cash out the ticket if their image matches the decoded image. A player's image may also be transmitted for verification when a player attempts to utilize a player reward card at a gaming machine. The image of a person who is issued a player card, smart card or the like may be stored on the card. The card may only be used if the an image of the person attempting to use the card as collected at the gaming machine matches the image stored on the card.

Further features, and advantages of the present invention over the prior art will become apparent from the detailed description of the drawings which follows, when considered with the attached figures.

DETAILED DESCRIPTION OF THE INVENTION

In one or more embodiments, the invention comprises a gaming machine which includes at least one security data collection device, a security or monitoring network including at least one gaming machine having such a collection device, and methods of monitoring gaming machines for security and other purposes. In the following description, numerous specific details are set forth in order to provide a more thorough description of the present invention. It will be apparent, however, to one skilled in the art, that the present invention may be practiced without these specific details. In other instances, well-known features have not been described in detail so as not to obscure the invention.

In general, the present invention comprises a gaming machine including at least one security data collection device for obtaining information regarding activities associated with or occurring around the gaming machine. The gaming machine may be associated with a network, whereby collected security data may be transmitted to a location remote from the gaming machine. One or more methods comprise monitoring gaming machine activity with the one or more security data collection devices.

Figure 1:
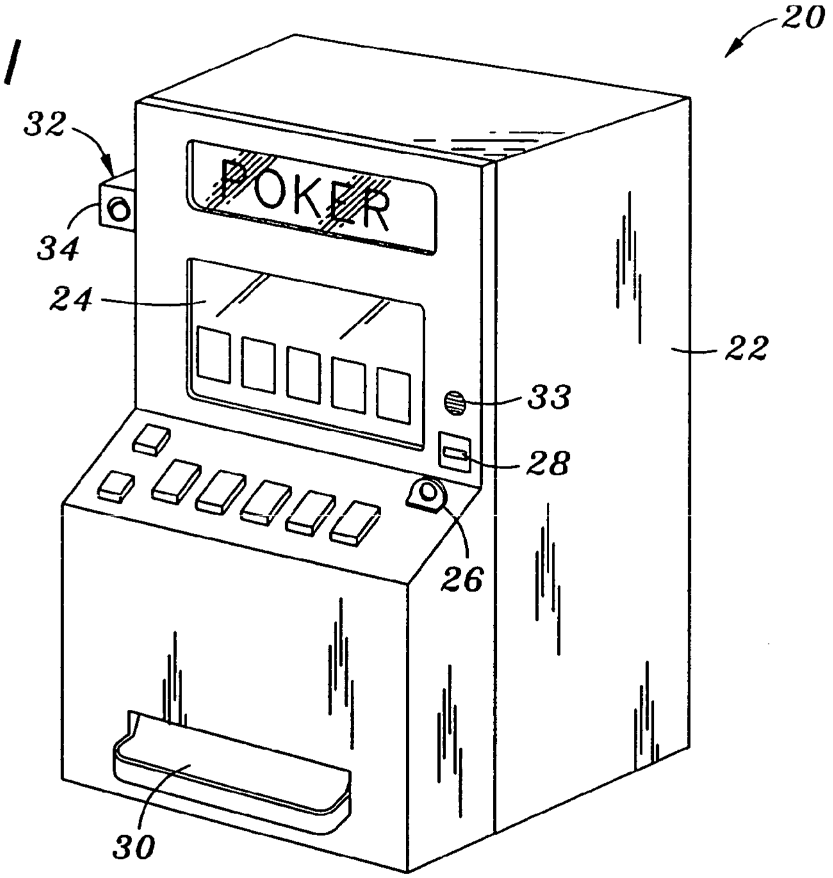
FIG. 1 is a perspective view of a gaming machine including at least one security data collection device in accordance with the present invention.

Referring to FIG. 1, there is illustrated one embodiment of a gaming machine 20 in accordance with the present invention. In general, the gaming machine 20 is adapted to present at least one game for play to a player. As illustrated, the gaming machine 20 includes a housing 22 which supports and/or houses the various components of the gaming machine 20. In the embodiment illustrated, the gaming machine 20 is adapted to present a game of video poker and includes a display 24 for displaying images of cards and other information. A variety of buttons are provided by which a player may provide input, such as an instruction to deal cards, hold cards, place bets and cash out.

In one or more embodiments of the invention, the gaming machine 20 is adapted to present a wager-type game. In this arrangement, a player is required to place a bet or wager in order to participate in the game. The event the outcome of the game is a winning outcome, then the player may be provided with an award. In one arrangement, the award may be winnings based upon the amount wagered or bet by the player.

In order to accept a wager, the gaming machine 20 may include a coin acceptor 26 for accepting coins. The gaming machine 20 may also include a bill acceptor or validator 28 for accepting paper currency. The gaming machine 20 may be provided with other means for accepting or verifying value, such as a credit card reader.

In this well known game, a player may be awarded a prize or payout if the outcome of the card hand is a predetermined combination of cards. In one embodiment, the award may be paid in coins, such as to a coin tray 30. In other embodiments, the award may be paid as a ticket, credit or the like.

It should be understood that the gaming machine 20 maybe adapted to present one or more of a wide variety of games. Depending upon the game presented, the configuration of the machine may vary. For example, in the event the gaming machine 20 is adapted to present the game of slots, then the gaming machine 20 may include a plurality of spinning reels.

As used herein, the term gaming machine is not limited to a machine such as that just described and illustrated in FIG. 1. For example, the principles of the invention may be applied to a wide variety of devices or systems which are adapted to present one or more games. Such devices include personal computing devices, whether of the desktop, notebook, hand-held or other varieties, which devices are arranged to implement a game. Other devices may be specially configured to present one or more games, but be other than as configured above. Other devices may include gaming terminals or interfaces located in a wide variety of locations, whether custom configured or having a more general applicability. For example, the device may comprise a gaming terminal which is located in a hotel room. As noted, the device may also comprise a personal computing device located in a player's home.

In a preferred embodiment of the invention, the gaming machine 20 has a security or monitoring system/feature including at least one security data collection device. Preferably, this system includes at least one image collection device associated with the gaming machine 20 for obtaining image information regarding events occurring at or associated with the exterior of the gaming machine.

The image collection device may comprise a variety of types of devices. In one embodiment, the image collection device comprises a camera 32. The camera 32 may comprise a CCD or CMOS type image collection device. Preferably, the camera 32 provides an output signal representative of image information collected through a lens thereof. This output signal may comprise an analog or digital signal. The image collection device may be arranged to generate single frame or multi-frame (moving image) data or video, may include optical and/or digital zoom, light compensation and other features, and generate black and white or color image information. The image collection device may be arranged to generate infrared image information. Other features of the camera may include auto focus, macro focus, use of differing types of lenses (such as wide angle or telephoto), interchangeability of lenses, and use of filters such as polarizing filters and color filters, among others.

The camera 32 is preferably mounted to or supported by the gaming machine 20. As illustrated, in one embodiment the camera 32 has a body 34 which is mounted to the exterior of the housing 22 of the gaming machine 20. Of course, the camera 32 may be mounted to the gaming machine 20 in a wide variety of manners. For example, the camera 32 may be mounted within a portion of the housing 22 of the gaming machine 20. The camera 32 may be located behind display glass or the like so as not to be visible to a player of the gaming machine 20. For example, the camera 32 may be located behind security glass located in a top box mounted upon or set upon the top of the gaming machine 20. The camera 32 may also be mounted on a stand or other support which is connected to the gaming machine 20.

The camera 32 may be positioned in a number of locations. Preferably, the camera 32 is positioned to obtain image information regarding a player of the gaming machine 20 and activities of that player while interacting with the gaming machine 20. As illustrated, the camera 32 is directed outwardly (i.e. the lens or other light gathering element is directed towards) of the gaming machine 20 in the direction of a front of the machine and the area where a player normally sits or stands while using the gaming machine 20. In addition, the camera 32 is directed downwardly to encompass the area of the buttons, coin acceptor 26, and bill validator 28.

it will be appreciated that depending on the size of the gaming machine 20 and the nature of the camera, more than one camera may be necessary to obtain image information from all of the desired areas. For example, depending upon the focal length of a lens of the camera (for example 20 mm vs. 35 mm), the area focused on the imaging surface may be smaller than the desired area of coverage. The configuration of the gaming machine 20 may also dictate the use of more than one camera. For example, the location of buttons or other input devices may be hidden from the view of another camera directed at the area of the player.

In one or more embodiments, the camera 32 may be moveable, whereby the various areas of image collection may be changed. For example, the camera 32 may be mounted in a manner permitting it to rotate from side to side, pivot up and down, and/or travel laterally or vertically.

As also indicated above, in another embodiment, the camera 32 may be provided with a zoom feature for changing the areas of focus. In one or more embodiments, the zoom may comprise an optical zoom or a digital zoom. These features of the camera 32 may be controlled remotely, such as via a control unit as described in more detail below.

In one or more embodiments of the invention, the camera 32 may employ a wide angle lens. This arrangement permits collection of image data over a wide angle, but in some instances may cause the collected image to be distorted. Software or hardware, such as associated with a camera (video) controller or with a main gaming machine controller or other device may be used to perform image enhancement. Software may also be provided which define minimum levels of motion detection, whereby collected image data may not be saved or transmitted unless a level of activity above the minimum level is detected. This arrangement aids in reducing the amount of data transmitted and stored, saving bandwidth and memory.

Various aspects of the methods of use of the camera 32 and the advantages thereof are described in detail below.

In one or more embodiments, the gaming machine 20 preferably includes a security data collection/monitoring device comprising an audio collection device. Referring to FIG. 1, in one embodiment, the audio collection device comprises a microphone 33. The microphone 33 may be of a variety of types, including the well-known electromechanical diaphragm type. In one embodiment, a single element which is capable of use both as a speaker for generating audible information and a microphone for collecting audible information, may be utilized.

The microphone 33 is associated with the gaming machine 20 and arranged to collect audio information generated about or traveling to the vicinity of the machine. In a preferred embodiment, at least one microphone 33 is arranged to collect audio information associated with the front exterior portion of the gaming machine 20, such as a player's voice. Of course, there may be a plurality of audio collection devices associated with the gaming machine 20 and such devices may be located in a variety of positions. In one embodiment, the microphone 33 or other audio collection device is generally hidden from view by a player.

Figure 2:
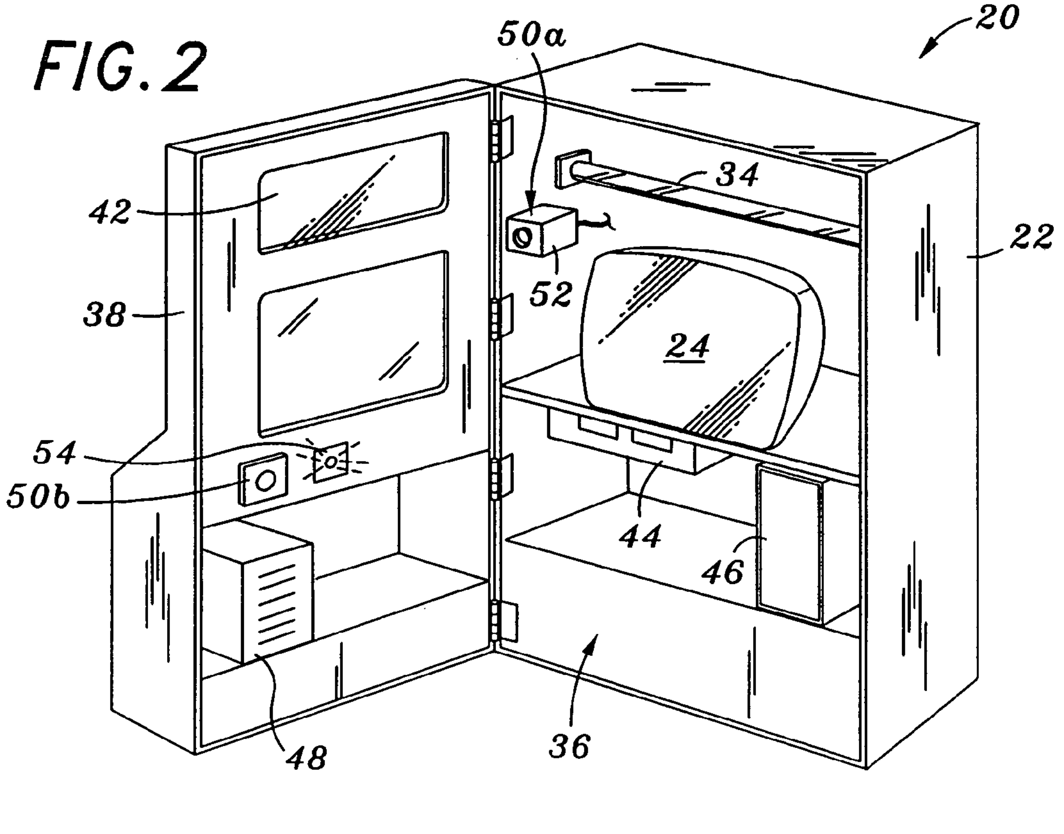
FIG. 2 is a perspective view of the gaming machine illustrated in FIG. 1 with a door thereof illustrated in an open position exposing an interior of the gaming machine.

Referring to FIG. 2, in one or more embodiments, the gaming machine 20 includes an interior 36 in which are located a plurality of devices. As illustrated, the gaming machine housing 22 includes a door 38 moveable between open and closed positions for selectively accessing the interior 36. FIG. 2 illustrates the door 38 in an open position, whereby access to the interior 36 is permitted. FIG. 1 illustrates the gaming machine 20 with the door 38 in a closed position. In the embodiment illustrated, the door 38 is mounted to a main portion of the housing 22 with one or more hinges.

Referring still to FIG. 2, a variety of equipment for implementing a game is housed within the interior 36. As illustrated, the display 24 is mounted for alignment with a port in the door 38 for viewing by a player. A light 34 is provided for backlighting gaming machine glass 42 located in an upper portion of the door 38. A gaming machine controller 44 is provided which controls the various components/devices of the gaming machine 20, as is well known. A bill or cash box 46 is provided for housing currency, such as paper bills or tickets, accepted by the gaming machine 20 through the bill validator 28. A coin hopper or box 48 is provided for housing coins which are accepted through the coin acceptor 26 and from which coins may be dispensed to the coin tray 30 as winnings. As such does not form a portion of the invention herein, the details of all of these various other devices associated with the gaming machine 20, including their arrangements, configurations and workings are not described herein. Such information is known to those of skill in the art.

In a preferred embodiment, at least one security data collection device is arranged to generate or obtain image information regarding activities in or at the area of the interior 36 of the gaming machine 20. As illustrated in one embodiment, two "interior" cameras 50*a,b* are provided. As with the exterior camera(s) 32, the number, location and type of interior cameras 50*a,b* may vary.

In one or more embodiments, a first interior camera 50*a* is arranged to obtain image information regarding events associated with the door 38 and the area around the door. As such, the first interior camera 50*a* is mounted to the main portion of the housing 22 and is directed outwardly towards the door 38. As illustrated, the first interior camera 50*a* has a body 52 which is mounted to an interior of the housing 22.

In one or more embodiments, a second interior camera 50*b* is arranged to obtain image information regarding events associated with the main portion of the housing. As such, the second interior camera 50*b* is mounted to the door 38 and is directed outwardly towards the main portion of the housing 22. In the embodiment illustrated, the second interior camera 50*b* is mounted within a portion of the door 38.

In a preferred embodiment, one or more lights 54 are provided for illuminating areas of the gaming machine 20 where image information is to be gathered. For example, the light 54 may be associated with the door 38 and project light towards the interior portion of the housing 22. Other means for lighting the desired areas may be provided, including use of flashes. In one or more embodiments, infrared cameras may be used in low light locations. In one embodiment, the light 54 or other means of illumination may be activated only when the camera(s) 50*a,b* are activated.

In the preferred embodiment of the invention, each camera 32, 50*a,b* is arranged to obtain image information or data. In one embodiment, each camera 32, 50*a,b* is arranged to provide moving image information or data. In other embodiments, the cameras 32, 50*a,b* may be arranged to provide still image (i.e. single "frame") data. In a preferred embodiment, the output of each camera 32, 50*a,b* is a digital signal representative of the image(s).

In like fashion to the video or image collection devices, one or more audio collection devices may be arranged to collect audio information associated with the interior portion of the gaming machine 20.

Figure 3:
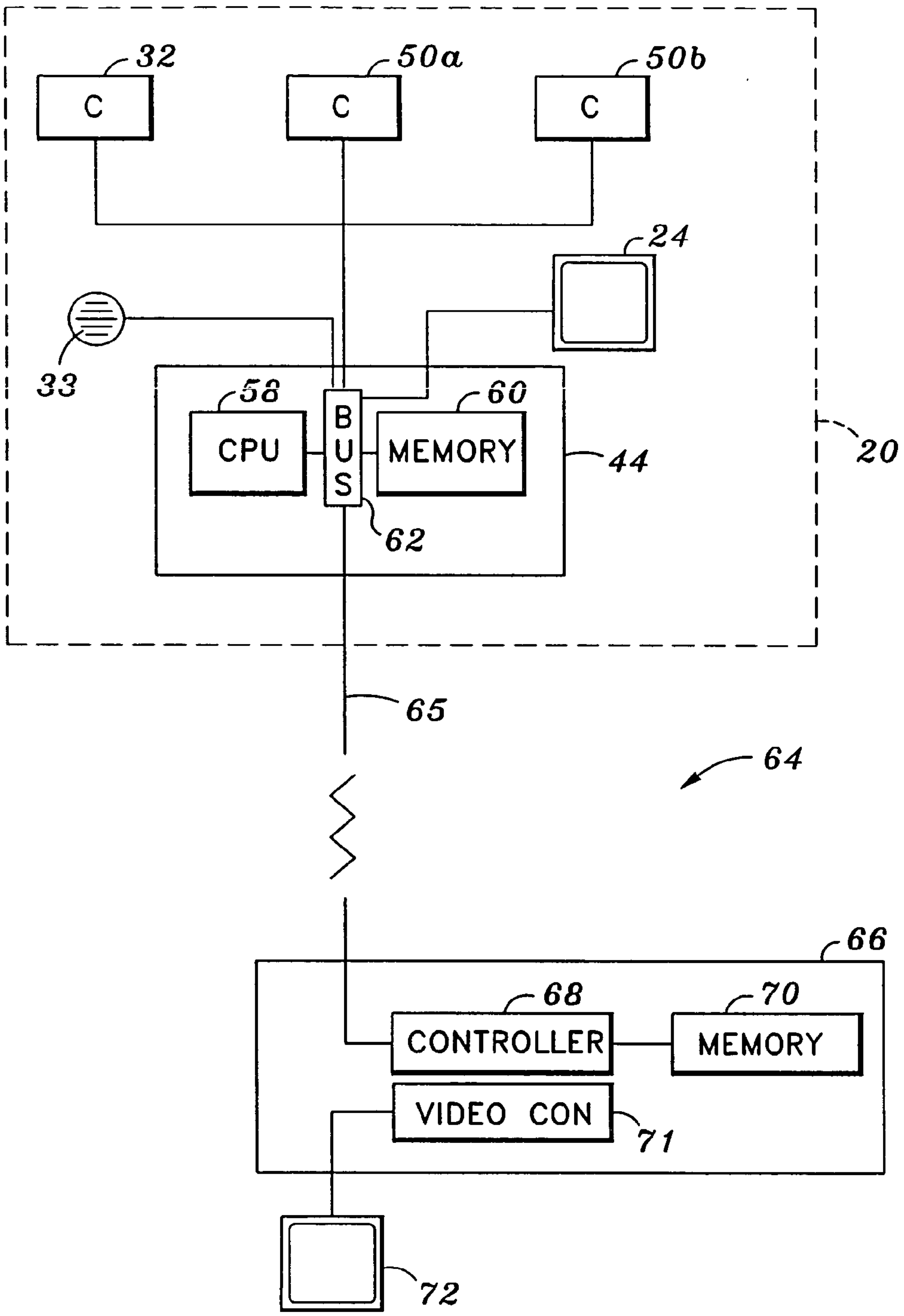
FIG. 3 is a schematic diagram of a control unit of the gaming machine illustrated in FIGS. 1 and 2, the control unit associated with a gaming machine security network.

In one or more embodiments of the invention, means are provided for controlling the security data collection devices and utilizing the data collected or obtained thereby. FIG. 3 illustrates a configuration of a control unit for a gaming machine 20, including the above-referenced cameras 32, 50*a,b* and microphone 33. As illustrated, the gaming machine 20 includes a gaming machine controller 44. The controller 44 may have a variety of forms. In one embodiment, the gaming machine controller 44 includes a data processing device or "processor" 58. The processor 58 may be of a variety of types, including one or the many readily commercially available such as those manufactured by AMD, Sun Microsystems and Intel.

In one embodiment, the gaming machine controller 44 includes a memory 60 or other information storage device for storing data. The memory 60 may be of a variety of types, such as RAM, SDRAM, DRAM, EEPROM and Flash RAM. In one or more embodiments, the master gaming controller 44 may include a mass storage device such as a hard drive, CD-RW, DVD-RAM, compact flash RAM or the like for storing larger quantities of data.

In one embodiment, the various devices of the gaming machine controller 44 are associated with a bus 62. The bus 62 may be of a variety of types. In one embodiment, the bus 62 is a bi-directional system bus which may contain, for example, thirty-two address lines for addressing a video memory or main memory. The bus 62 may preferably also include a thirty-two or sixty-four bit data bus for transferring data between the components associated with the bus 62. Alternatively, multiplex data/address lines may be used instead of separate data and address lines.

A variety of devices/components may be associated with the bus 62. For example, the display 24 may be associated with the gaming machine controller 44 via the bus 62. As will be appreciated though not illustrated, a number of other devices of the gaming machine 20, such as the bill validator, coin acceptor and the like may be associated with the gaming machine controller 44 via the bus 62.

Preferably, the cameras 32, 50*a,b* are associated with the gaming machine controller 44 via the bus 62. This association permits the cameras 32, 50*a,b* to transmit image data to the gaming machine controller 44, and allows the processor 58 to send data, such as camera control instructions (such as tilt, pan, zoom, turn on, turn off) to each camera 32, 50*a,b*. Likewise, the microphone 33 is also associated with the gaming machine controller 44 via the bus 62. This association permits the microphone 33 to transmit audio data to the gaming machine controller 44, and allows the processor 58 to send data, such as microphone on/off instructions or controls to the microphone or a microphone controller.

The cameras 32, 50*a,b* and microphone 33 may be connected to the system bus 62 in a variety of manners, such as via a wired RS-232 connection, a USB connection, an IEEE-1394 (Firewire®) connection, or even a wireless communication link. It will be appreciated that in those cases, appropriate communication devices/interfaces may be provided.

In the one embodiment, data in digital form may be transmitted to and from each camera 32, 50*a,b*. If the camera 32, 50*a,b* is adapted to provide an analog output, this output may be converted to digital format using an A/D converter, and then be transmitted. As will be appreciated, such data may be directly stored in the memory 60. Alternatively, the analog output may be transmitted and the information in analog form stored by a different storage device. For example, the information storage device may comprise a video tape. Data collected by the microphone 33 may similarly be transmitted, converted if necessary and stored. Details regarding an alternate embodiment of the invention wherein the image and audio information is transmitted from the cameras 32, 50*a,b* and microphone 33 in analog form is provided below.

In one or more embodiments, the security data or information storage device or memory may be different or separate from the memory 60. For example, a dedicated security data or information memory may be associated with the bus 62 or directly with each camera 32, 50*a,b* and In one or more embodiments of the invention, the gaming machine 20 including at least one security data collection device is associated with a security/monitoring network 64. In a preferred embodiment, the security network 64 includes at least one remote control station 66. This station may be located in a secure area of a casino or other location remote from the gaming machine. As illustrated, the control station 66 includes a main controller/processor 68 and a memory 70, in similar fashion to the gaming machine controller 44. Preferably, the memory 70 includes at least one information or data mass storage device.

In one or more embodiments, the security/monitoring network 64 may be a part of another network or comprise any network. For example, the gaming machine 20 may be associated with a player tracking or reward system network for monitoring play data from a remote location. The security/monitoring network 64 may be associated with or comprise one or more portions of such a network. The security/monitoring network 64 may be associated with other devices/networks as well. For example, a portion of the security/monitoring network 64 may include an existing wide area progressive or casino accounting system/network. In this manner, additional wiring or network devices are reduced or eliminated. In addition, in some instances a gaming machine may not include a controller capable of communicating or interfacing with the camera 32, 50*a,b*, and may not include a communication link with a remote device. Such may be the case with older gaming machines. In accordance with this embodiment of the invention, the camera (and/or microphone or other device) may be associated with the player tracking or other device. Such a device may be added to the gaming machine and already be provided with a communication link. In addition, the device may include a controller or other device which is useful in controlling the camera remotely and receiving image data for transmission to the remote device.

In one embodiment, the control station 66 includes a video controller 71 for providing a video output to at least one video monitor/display 72. The monitor 72 may comprise an LCD, CRT or other type of display. More than one display 72 may be associated with the control station 66.

A communications link 65 is provided between the gaming machine controller 44 and the control station 66. This link may be a wired or wireless communication link. The protocol/architecture of the communications link, including interfaces associated with the gaming machine controller 44 and control station 66 may be of a variety of types. For example, if the link is a wireless link, the protocol/architecture may be Bluetooth or IEEE 802.11 (b). For wired links, the protocol/architecture may be RS-232, IEEE-1394 (Firewire®), Ethernet, or TCP/IP. As noted above, the link may be associated with or provided through another network, such as a player tracking network.

Figure 4:
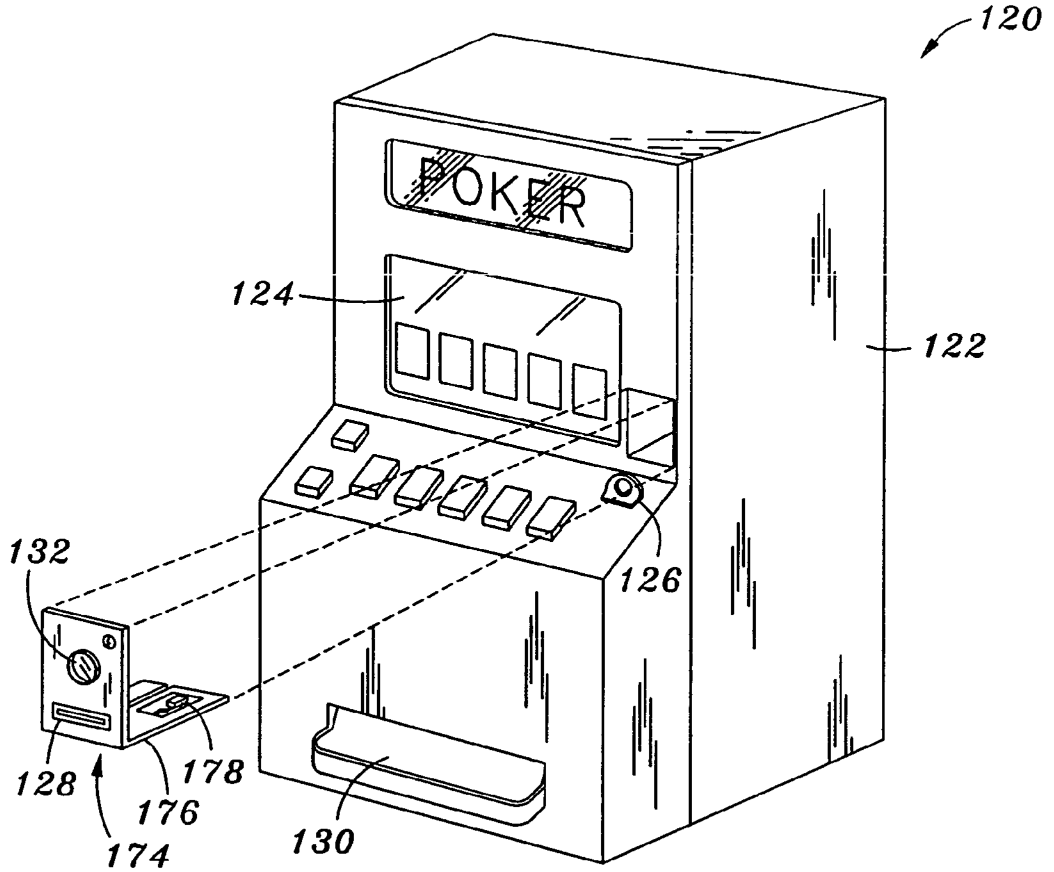
FIG. 4 is a perspective view of a gaming machine in accordance with another embodiment of the invention, the gaming machine including a peripheral having an associated security data collection device.

Another embodiment of the invention is illustrated in FIG. 4. In this embodiment of the invention, the one or more image collection and/or audio collection devices are associated with a peripheral device of the gaming machine 120. As detailed below, the association of the security data collection device with the peripheral device may comprise a physical association/connection and/or simply a control/communication association. As illustrated, the gaming machine 120 is similar to that illustrated in FIG. 1. The gaming machine 120 includes a player tracking device 174. Preferably, the player tracking device 174 is a "stand-alone" or "add-on" type device which may be used with a variety of gaming machines. As such, the player tracking device 174 includes a housing 176 for supporting one or more elements. As illustrated, the housing 176 is adapted to fit into a slot or opening in the housing 122 of the gaming machine 120 and be mounted to the housing 122 or other support structure of the gaming machine 120.

Figure 5:
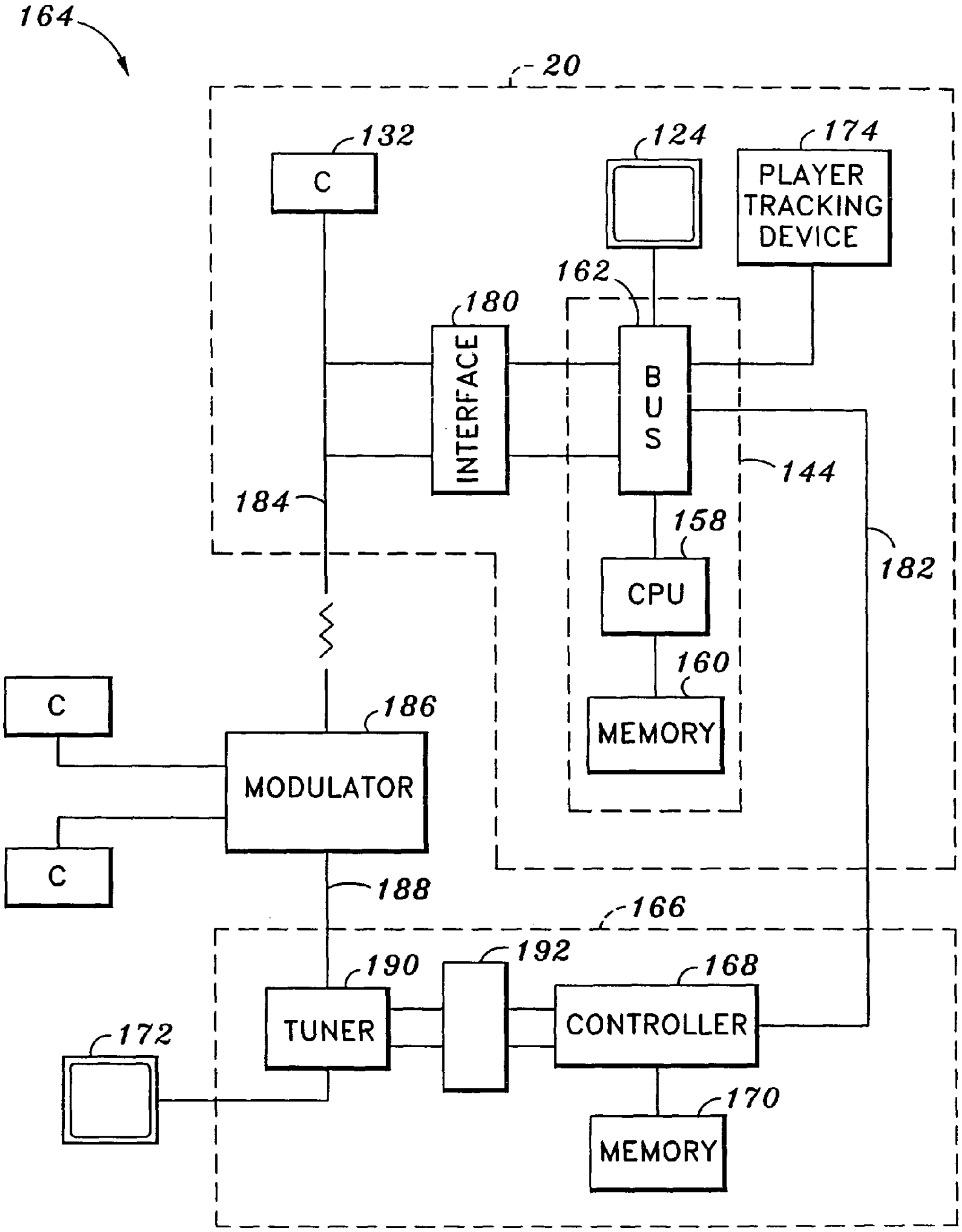
FIG. 5 is a schematic diagram of a control unit of a gaming machine and associated gaming machine security network in accordance with another embodiment of the invention.

In one embodiment, the player tracking device 174 includes a card reader 128. The card reader 128 may comprise a magnetic stripe or other type of reading and writing device. The player tracking device 174 also includes a controller 178. The controller 178 may be adapted to perform a variety of functions, such as store, manipulate and transmit data read by the card reader 128, control the card reader 128, including causing the card reader 128 to write data to a card, and obtain and manipulate other data, such as game play data received from a gaming device controller 144 (see FIG. 5). As illustrated in FIG. 5, the player tracking device controller 178 maybe associated with the bus 162 of the gaming device controller 144. In this regard, leads, pins or other connectors may provide the necessary interface between these controllers. In this arrangement, the player tracking device 174 comprises a peripheral of the gaming machine 120, as the gaming device controller 144 is adapted to control the player tracking device 174, including sending and receiving information therefrom.

In one embodiment of the invention, a camera 132 is physically associated with the player tracking device 174. As illustrated, the camera 132 is supported by the housing 176 of the player tracking device 174. In this embodiment, the player tracking device 174 is adapted to be mounted to a front section of the housing 122 of the gaming machine 120. The camera 132 is mounted to face outwardly from the player tracking device 174, and thus is directed towards the front of the gaming machine 120 when installed. As in the prior embodiment, the camera 132 is adapted to collect image information. In like manner to that detailed above and as specifically described below, the camera 132 is also adapted to transmit this information to one or more other devices/locations.

In one or more embodiments, more than one camera 132 may be associated with a peripheral device of the gaming machine. Instead of a camera, or in addition to one or more cameras, a microphone or other audio information collection device may be associated with the peripheral.

The image and/or audio collection device(s) may be associated with additional or other peripheral devices of the gaming machine. For example, one or more security data collection devices may be associated with a credit card reader, bill validator, cash box or the like. It will be appreciated that one or more of these peripherals may be located inside or outside of the gaming machine, and thus the information which is collected may be associated with activities occurring inside and/or outside of the gaming machine.

In one embodiment the camera 132 or other security data collection device(s) may be controlled via a gaming controller as illustrated in FIG. 3. In some situations, especially older gaming machines, no communication link exists with the gaming controller. In such event, a link may be provided, as illustrated in FIG. 3. This may be cost and time prohibitive. Even in these machines, however, a peripheral device may be associated with a network or otherwise include a communication link. For example, a player tracking device is typically associated with a player tracking network, and thus includes a communication interface connected to a communication link provided to a remote location.

In one embodiment, the security data collection device may be associated with the peripheral device for control and/or communication purposes. For example, the camera 132 may be linked to the player tracking device controller 178. The communication link 65 in FIG. 3 may comprise a link of the player tracking network. Image data may be transmitted from the controller 178 via the player tracking network (or at least a portion thereof) to a remote location. Camera control/operation instructions may be sent from the remote location to the camera 132 through the player tracking network and player tracking device controller 178.

FIG. 5 illustrates a control and security monitoring system 164 in accordance with another embodiment of the invention in which a security data collection device provides an analog output. This embodiment control and system 164 will be described with reference to the gaming machine 120 illustrated in FIG. 4. It will be appreciated, however, that the control and system may be used with gaming machines having other configurations.

As illustrated, the gaming machine 120 includes a gaming controller 144 which includes a bus 162, a CPU 158 and a memory 160. As detailed above, the player tracking device 174 and other peripherals (such as display 124) are preferably associated with the gaming machine controller 144, such as via the bus 162. As also noted above, the gaming controller 144 may have a variety of other configurations other than that illustrated.

In general, in this embodiment of the invention the camera 132 is adapted to provide an analog output. In one embodiment, the output is provided to a bus/communication interface 180 which includes an analog to digital converter. The output of the interface 180 is provided to the bus 162. In this fashion, image information may be manipulated by the CPU 158, including being stored to the memory 160. As illustrated, control signals generated by the CPU 158 may be output to the camera 132 via the interface 180, which also preferably includes a digital to analog converter.

Likewise, in this embodiment, the security monitoring system 164 includes a remote station 166. As illustrated, the station 166 again includes a controller 168 and a memory 170. In one embodiment, a data/communication link 182 is provided between the gaming machine controller 144 and the remote station controller 168. In a preferred embodiment, this data/communication link 182 comprises a wireless or wired link permitting transmission of digital data. Such data may comprise control instructions, as detailed below.

Preferably, the output of the camera 132 is provided via an analog link 184 to a modulator 186. In one or more embodiments, the outputs of other cameras, such as additional cameras associated with the same gaming machine 120 or cameras associated with other gaming machines, are provided to the modulator 186. In general, the modulator 186 is adapted to modulate (such as by frequency or amplitude) the signals in channel format, as is well known in the art of analog data transmission. The details of such a modulator are also well known in the art, and thus not described in detail herein.

The output of the modulator 186 is provided to a main analog link 188. Such a link 188 may comprise a wired or wireless link. For example, the link 188 may comprise coaxial cable. In one or more embodiments, the modulator 186 is arranged to output a signal in accordance with the NTSC or PAL Standard Signal Forms.

The link 188 is provided between the modulator 186 and at least one tuner 190. Using the tuner 190, the individual camera output signals may be selected from the combined modulated signal. The output of the tuner 190 may be provided to a display 172 for watching streaming video or image data from a particular camera.

As also illustrated, the output from the tuner 190 may be provided to an interface 192 which includes an analog to digital converter. The converted analog signal may be input to the controller 168, such as for storing the image data in digital form in the memory 170. Control instructions, such as tuner channel selection, may be provided from the controller 168 to the tuner 168 via the interface 192.

In one or more embodiments, a microphone may also be associated with the security system 164 in a similar manner to the camera 132, namely that its output may comprise an analog output signal which is modulated with other signals and then obtained using the tuner 190 or a different tuner.

One or more methods of using the security data collection devices associated with a gaming machine will now be described. In a preferred embodiment, the gaming machine controller 44/144 or other control device (such as located at a remote station) is arranged to cause the storage of image information from the one or more security data collection devices, such as camera(s) and/or microphones. In one embodiment, image information from each security data collection device is stored (such as in memory or on tape). The information may be stored at the machine 20 or remotely.

As will be appreciated, over time, the amount of stored information would become excessively large, resulting in the need for a very large memory or other information storage device associated with the gaming machine. Thus, in one embodiment of the invention, image information is overwritten after a predetermined period of time or after a predetermined amount of information is stored, unless a predetermined event occurs. For example, the memory 60, 160 may be arranged to store up to 30 minutes of image information from each camera or audio data from each microphone. At the beginning of the next 30 minute period, the oldest data from the previous 30 minute period is over-written. Similarly, if the information is stored to a tape, the tape may run in continuous fashion and over-write the older image information. Alternatively, the information may be overwritten after a predetermined amount of information is stored, such as 100 MB in a data storage device.

A variety of other features regarding the use and output of the one or more cameras may be employed. For example, in order to reduce the quantity of image data collected, the camera may be arranged to collect images spaced apart in time (i.e. "time lapse"). The time lapse image output is useful in assessing events which change slowly over time or to reduce the amount of time necessary to obtain information. For example, time lapse images may be useful in viewing the traffic level of patrons in the area of the casino adjacent the gaming machine with which the camera is associated. Time lapse images are also useful as they reduce the amount of generated information, and thus reduce the amount of data storage necessary and data transmission bandwidth.

In one or more embodiments, a variety of data manipulation techniques may be employed to reduce the amount of image data which is transmitted. For example, the collected image data may be compressed, the resolution reduced or the data converted to grey scale. The number of colors for color resolution may be reduced, such as from 16 bit (65,536 colors) to 8 bit (256 colors). The reduced quantity of the image data may then be transmitted, such as over a communication link, or stored.

In a preferred embodiment, if any of one or more predetermined or "trigger" events occurs, then the security information or data is stored (and not overwritten) unless an additional instruction is received. In another embodiment, trigger events may cause the storage and/or transmission of security information in a wide variety of manners and for a wide variety of uses. In one embodiment, security information or data is stored or transmitted only if a trigger event occurs.

These trigger events may be varied. In one embodiment, such an event may comprise a winning payout, a machine malfunction, a door opening/closing, a coin hopper dump or bill box exchange, movement detected by the camera, a loud sound detected by the microphone, use of a player tracking card (such as card insertion or PIN entry), a ticket print/issue event, an electronic funds transfer (such as credit card read) event, detection of a particular spoken word or words, or a wide range of other events.

A number of actions may occur in response to a trigger event. For example, in the event a winning payout occurs, image information may be obtained and transmitted to a remote location for storage. This image may be used when the payout is awarded. The collected image is compared by casino personnel to the person who attempts to collect the payout. The image information may also be used to confirm the identity, including age, of the party. For example, the image may be scanned against stored images (even through driver's license images stored remotely).

In the event of a door opening/closing, coin hopper dump or bill box exchange, image data maybe collected and transmitted to a remote location. Security personnel at the remote location may use the image data to confirm that the party who is engaged in the activity is permitted to do so. If not, security personnel may be alerted.

In the event of a loud sound, movement, particular words or the like, the image data may be collected and transmitted for storage and analysis. An alarm may also be triggered. Security personnel may then observe the image data and determine if an undesirable activity is occurring. If so, security personnel may travel to the gaming machine.

In one embodiment, a player card may be reported as stolen. The status of the player card as stolen may be indicated in the gaming system. If a later attempt is made to use a stolen player card, a signal may be provided to the gaming machine 20 causing security information to be collected. In one embodiment, this information may comprise the image of the person who is attempting to use the stolen card.

Other events which may be specifically caused to trigger obtaining security information or data may include an attempt to pass fraudulent currency. For example, if a bill validator of the gaming machine 20 detects that a person is attempting to pass a fraudulent or counterfeit bill, then a signal may be provided for causing security information to be obtained. This information may include the image of the person passing the bill.

Likewise, security information may be obtained if the gaming machine detects that a party is attempting to pass invalid or fraudulent tickets (in a arrangement where tickets may be used in lieu of coin or currency), or utilize a stolen or invalid credit card, or where the user provides other invalid input. For example, if a player attempts to retrieve credits from the gaming machine and fails to provide the proper input three consecutive times, then security information may be obtained and transmitted and stored.

As described in greater detail below, in the event a trigger event occurs or is detected, then an alarm may also be triggered. The alarm may be used alone or in conjunction with transmitted collected security information. The immediate triggering of the alarm and providing of security information, such as an image of the party using the machine, may be useful to security personnel. In one embodiment, the image may be transmitted, such as to portable devices used by security personnel. These may include wireless devices such as cellular phones and personal data assistants.

Any such trigger event may be identified by a code, such as a payout code generated by the CPU 58,158 as a result of game play. Such events and their occurrence in gaming machines is well known.

In a preferred embodiment, collected security data or information for a time period both before and after the event is stored. For example, in the event of a winning payout, image and audio information generated during the period of time 10 minutes before and 10 minutes after the payout may be stored and not overwritten.

In one or more embodiments, collected security data or information is transmitted to the control station 66,166. First, a user of the control station 66,166 may send a request for collected security data or information from any camera, microphone or other security data collection device associated with the gaming machine. In one embodiment, as illustrated in FIG. 3, the data may be transmitted from the gaming controller 44. In the embodiment illustrated in FIG. 5, the information may be obtained via the tuner 190. In either event, the image, audio or other information may be stored at the memory 70,170 for later use, such as display or playback. In addition, a user of the station 66,166 may immediately view the image information. The user may view the image information "real time" using the monitor 72,172 as the image information is generated and transmitted. Likewise, audio information may be played in real time through a sound reproduction device, such as a speaker.

As will be appreciated, depending upon the configuration or nature of the data or communication links provided, the bandwidth or total volume of information which may be transmitted over the link may be limited. In that event, it may be desirable to not have the collected security data or information continuously transmitted to the remote station. In one embodiment, the data or information may be transmitted upon request, such as described above upon a signal from the control station 66,166.

In another embodiment, if a "trigger" event occurs, then collected security data or information is automatically transmitted from the gaming machine controller 44,144 to the control station 66,166. The trigger event may comprise any number of events, such as the above-referenced winning payout, door opening/closing, coin/bill events or otherwise. This information is preferably transmitted to the control station 66,166 over the network for storage and/or viewing.

It will be appreciated that the collected security data or information associated with activities occurring prior to a trigger event can not be transferred real-time (since the event triggering the information transfer will have not yet occurred but the information before the event will have been stored). Thus, in one embodiment, when a trigger event occurs, the collected security data or information for a period of time before and after the event which is stored at the memory 60,160 of the gaming machine controller 44,144 may be transmitted to the control station 66,166.

In one or more embodiments, the security data collection device may be arranged to continuously generate/collect data. In another embodiment, the device may only collect data at certain times, such as certain times of day or upon the occurrence of certain events. In other embodiments, the device may collect data when instructed, such as by a control signal from the remote station.

As noted above, in one embodiment motion detection software may be provided which is used to monitor the level of motion represented by collected images. If the level of motion does not meet a predetermined minimum level, then the collected image information may not be stored, both saving memory, and in the case where such information is normally transmitted to a remote location, bandwidth.

Noise level and/or trigger events may also be applied to the information gathered by the microphone. In one embodiment, audio information is not stored or transmitted unless the level of detected sound or noise is above a predetermined threshold. Sufficiently loud noises, such as input of coins, pulling a handle of the machine, talking, banging the gaming machine or other sounds may trigger the storage or transmission of the audio data. In yet another embodiment, the software may be provided for analyzing the sounds detected by the microphone. One or more "trigger" noises may cause the storage and/or transmission of the audio information from the microphone. In one embodiment, an alarm may be sounded upon detection of a particular noise. The "trigger" noises may comprise particular spoken words, such as "cheat," "break" or the like. The "trigger" noises may also comprise banging sounds.

The collected data may be stored continuously or only upon occurrence of an event. The data may be stored at the device, machine or remotely.

In one embodiment, the security data collection devices may be activated only when gaming activity is occurring. For example, the security data collection devices may be activated when a player places a wager (such as by detection of an input coin or currency) or by insertion of a player tracking card or input to one of the buttons of the gaming machine. When game play stops, the security collection devices may be deactivated. In one embodiment, if no gaming activity is detected for more than 5 minutes, the security data collection devices may be deactivated. The security data collection devices may then remain deactivated unless a trigger event occurs (such as a loud noise or motion) or until game play resumes. The deactivation of the security data collection devices is especially useful in preventing the gathering of non-game/gaming related events, such as when a camera is associated with a remote gaming station in a player's hotel room or the like. In one embodiment, an active indicator may be provided to indicate to that the camera, microphone or other collection device is active. For example, an LED may be associated with the camera, the LED illuminated when the camera is activated and collection image information. In this manner, a player or hotel room guest may determine when the camera or other collection device is activated.

One particular advantage of the security system illustrated in FIG. 5 is that streaming security data or information may be provided to the remote station 166 via a narrow bandwidth link. This is also the case where the streaming security data or information is provided over an independent link 188 from a control or other communication link 182.

As another aspect of the invention, an alarm may be provided in the event one or more of the security data collection devices become disabled or are interfered with, or if a particular trigger or other event occurs. For example, in the event the lens of the camera is blocked to prevent the gathering of image information for more than a predetermined period of time, the camera or the controller monitoring the collected image information may generate an alarm or alarm signal. In one embodiment, the alarm signal may cause the illumination of a light or the sounding of an audible alarm element associated with the gaming machine. In another embodiment, the alarm signal may be transmitted over the network to a remote location for response by appropriate gaming personnel. Appropriate software may be provided for detecting a "black out" condition of the camera, triggering such an alarm. An alarm may be triggered if one or more other events occur. For example, in the event a party attempts to use a stolen player card, image information may be obtained and in addition an alarm may be triggered. By triggering the alarm immediately, security personnel are alerted to the event and can immediately utilize the image of the person to track the person.

In one or more embodiments of the invention, the security data collection devices may be arranged to associate identifying information with the collected data or information. For example, any combination of date, time, gaming machine identification number (such as I.D. or serial number) or machine location may be associated with the collected data or information. This identifying information may comprise data which can be viewed or heard along with the collected data. In another embodiment, the identifying information is associated with the collected data or information when stored. For example, the processor of the gaming machine controller may be arranged to associate this information before storing the data at the memory. In one embodiment, images may be automatically cataloged, stored and retrieved. Cataloging and retrieval of images may be based upon a variety of criteria, such as trigger events, time, gaming machine I.D. or other criteria.

It will be appreciated that the principles herein may be applied to security data collection devices in general, even when specified detail is provided as to the camera. For example, audio data may be compressed for storage and transmission in similar fashion to image data.

In one or more embodiments, a camera and/or microphone may be used as a part of a one or two-way player communication device. As one aspect of the invention, a player may be permitted to communicate with other parties, such as players of other machines or service personnel (i.e. casino cage, hotel front desk). Image and/or audio information regarding the player's request may be transmitted directly from the gaming machine to gaming personnel. In one embodiment, the gaming or other service personnel may transmit messages back to the player as well, such as by causing the display of information on a display associated with the gaming device and/or the generation of audio information, such as by a speaker of the gaming machine.

As another aspect of the invention, the "communication" aspect of the camera and/or microphone may be useful in the operation or repair of the gaming machine. For example, if the gaming machine needs repair, a technician may travel to the machine. The technician may use the camera and/or microphone to communicate with a manufacturer, remote help center or the like in repairing the machine. In one embodiment, the camera may be detachable and moveable, so that the technician may point the camera at a particular area of the gaming machine to provide the remote help with image information. Audio and/or video feedback could then be provided to the technician for completing the repair, in the manner described above in which a two-way communication path is provided.

It will be appreciated that a wide variety of systems and devices may be utilized to accomplish the method(s). For example, control instructions may be programmed directly into a controller of each camera. Alternatively, an entirely separate camera control and information storage system may be provided. This system may be associated with the gaming controller.

In one embodiment, an information storage device may be associated directly with all or each camera. For example, a memory card or tape may be associated with each camera.

In one or more of the embodiments, the security data collection devices may comprise combined camera and microphone devices. The output of such a device may comprise a data stream or signal including both audio and video information. As noted, in one embodiment, the camera and/or microphone may comprise devices arranged to output digital information. One preferred type of security data collection device is a CCD type digital image collection device, of which a variety of types exist. An example of a device including an integrated camera and microphone providing a digital output via USB is the Logitech Quickcam Pro 3000.

As noted, the security data or information which is collected may be used for a wide variety of purposes. For example, player image information may be obtained prior to a large payout for use in confirming that the player attempting to collect the payout is the same as was playing the game when the win was registered. This is useful in verifying that the player is entitled to the winnings, both by being the player who registered the win and of lawful age to play.

In one or more embodiments, the image information may be used for identification purposes. For example, as part of a player tracking/reward system, a player may have their picture taken and digitized. When the player attempts to use their player tracking card at a gaming device, their image may be collected by the camera. This image may be compared against the prior image of the player to ensure that the player is the true owner of the card being utilized. In this embodiment, the player's digitized image may be stored at a player file. The image may be transmitted to the camera or the collected image from the camera transmitted to a remote location. The two images may then be compared for verification purposes.

The present invention permits user authentication even though the gaming machine may not be currently associated with remote devices (such as when the gaming machine is "offline" of its associated network). In one embodiment, a player's image is obtained and directly associated with their player card. The player card may comprise a card associated with a player tracking/reward system or a variety of other cards. For example, the card may comprise a debit card or a smart card having value associated directly with the card.

When a party attempts to use the player card, the gaming machine may obtain an image of that person. The collected image of the party attempting to use the card is compared to the image which is stored on the card. If the images match, then the party is allowed to use the card. If not, the party attempting to use the card is identified as not authorized to use the card. In one or more embodiment, as indicated above, a signal may be send to appropriate personnel regarding the attempted use of the card. Security personnel or the like may then question the person. The gaming machine may also code the card so that is can not be used any further without traveling to a customer service center or the like.

This system has significant advantages in that in the case of smart cards, monetary value may be directly associated with the card. When the card is used, the monetary value is usable in the same form as cash. If the card is lost or stolen, the card may be used by another party at a gaming machine. In accordance with the invention, a security mechanism is provided for ensuring that only the true owner is permitted to use the card.

In some systems, such as International Game Technology's EZ-PAY system, a gaming machine is configured to issue a ticket or receipt to a player. This ticket has attributes of money, and may be used to provide credit at another gaming machine or be cashed in at a casino cage for currency. A player's picture may be printed upon such a ticket. In one embodiment, the picture may comprise a black and white or color image. In another embodiment, the player's picture may be digitized and imprinted on the ticket. For example, the player's image may be digitized and printed as a two-dimensional n×m binary matrix. The player's image may be converted to a variety of other forms which are not recognizable to a human or which otherwise alter the image so that it does not appear like the actual person when viewed. When a player wishes to utilize or cash the ticket in, the image of the player may be verified. For example, at another gaming machine, the player's image may be obtained and compared to the digital image read from the ticket. A camera at a cashier booth may be utilized to verify the player when the player wishes to convert the ticket to currency.

A player's image may be used for a wide variety of other verification purposes. For example, a player's image may be used as verification during an electronic funds transaction, automated teller or credit card transaction in similar fashion to that described above. A player may have their image associated with their bank account. When the player wishes to use a credit card as the basis for funds to play a game at a gaming machine, the player's image may be obtained and compared to the stored image for verification purposes.

One or more aspects of the invention may be applied to gaming devices which are associated with the Internet. In one embodiment, a game may be presented to a personal gaming device, such as a personal computer, from a remote server via the Internet. A security data collection device may be associated with the personal computer in a manner described above. Image, sound or other security data may be transmitted over the Internet using the TCP/IP protocol. Use of a player's image has significant advantages in a gaming system of this type. In order to verify that the player is entitled to play a game or wager on an event or game, the player may by law need to be of a particular age. A game operator or casino may access a database containing the images of persons of legal age. This database of images may be created by enrolling players, where the age of the player is confirmed and an image obtained and placed on file. Image information may also be obtained from state driver's license databases or the like. In any event, if a player wishes to place a bet or play a game from the remote location, the player's image may be transmitted and compared to the images of verified players for confirmation. The image information may also be used for other purposes, such as identifying a player who did not pay a gambling loss or is barred from participating in legalized gaming events.

The collected image information may have other uses besides "security" features. As described in part above, images maybe collected which provide information regarding events in the area of the gaming machine, such as patron traffic in that area of the casino. A collected image may be used as a marketing tool. For example, if a player is awarded a large payout, the image of the player may be captured and used in advertising or be provided to the player as a souvenir.

It will be understood that the above described arrangements of apparatus and the method therefrom are merely illustrative of applications of the principles of this invention and many other embodiments and modifications may be made without departing from the spirit and scope of the invention as defined in the claims. Features of the invention described herein may be provided alone or in any combination.

We claim:

1. A method of authorizing use of a card in a gaming machine and collecting security data regarding activities associated with the gaming machine, the method comprising:

generating first facial image information regarding a person;

storing said first facial information on a card issued to said person;

reading said first facial image information stored on said card with a peripheral device at said gaming machine in said casino;

obtaining current facial image information of a person using said card at said gaming machine using an image collection device, wherein the image collection device is physically incorporated with the peripheral;

comparing said first facial image information stored on said card with said current facial image information of said person at said gaming machine using said card to confirm that the person using said card is the party to whom the card was issued;

obtaining at least one image using the image collection device; and obtaining audio information using a microphone associated with the gaming machine, wherein the at least one image and the audio information are stored in response to a triggering event detected by either the image collection device or the microphone.

2. The method in accordance with claim 1 including transmitting said current facial image information of said person to a remote location in the event the current facial image information does not match the first facial image information.

3. The method in accordance with claim 1 wherein the image collection device is a camera.

4. The method in accordance with claim 3 wherein said gaming machine has a front which said person generally faces when playing games at said machine, said camera located at said front of said gaming machine.

5. The method in accordance with claim 1 wherein the image collection device is a camera generating analog data which is then converted to digital data.

6. The method in accordance with claim 1 wherein the image collection device is a camera which generates analog data which is then converted into digital data so that the comparing of the first facial image information stored on said card with the current facial information is a comparison of digital data.

7. The method in accordance with claim 1 wherein the image collection device is a digital camera.

8. The method in accordance with claim 1 wherein the image collection device is a digital camera located at said gaming machine.

9. The method in accordance with claim 1 wherein obtaining current facial image information comprises:

sensing a second triggering event; and in response to the second triggering event, capturing said current facial image information.

10. The method in accordance with claim 9 wherein the second triggering event is related to the peripheral device of the gaming machine.

11. The method in accordance with claim 9 wherein the second triggering event is a result of a game operating on the gaming machine.

12. The method in accordance with claim 1 further comprising controlling the at least one image collection device by a gaming controller for the gaming machine.

13. The method of claim 1, wherein the triggering event comprises a loud sound or particular spoken words detected by the microphone.

14. The method of claim 1, wherein the triggering event comprises a level of motion represented by the collected images.

15. The method of claim 1, wherein the stored at least one image and audio information are associated with each other.

16. The method of claim 1, further comprising controlling the microphone by a gaming controller for the gaming machine.

17. The method of claim 1, wherein the peripheral device is a player tracking device.

18. A method of authorizing use of a card in a gaming machine, the method comprising:

sensing a triggering event at the gaming machine, the triggering event being generated by a person interacting with a peripheral of the gaming machine, wherein the peripheral is associated with a communication link to a remote location for communicating user interaction with the peripheral to the remote location, wherein an image collection device is physically incorporated with the peripheral;

in response to the triggering event, attempting to obtain current facial image information of a person using said card at said gaming machine via the image collection device physically incorporated with the peripheral;

in response to obtaining current facial image information, comparing first facial image information stored on said card with said current facial image information of said person at said gaming machine using said card to confirm that the person using said card is the party to whom the card was issued; and in response to not being able to obtain current facial image information, generating security data indicating an alarm condition for the gaming machine and communicating the security data to a remote location.

19. The method in accordance with claim 18 wherein generating the security data comprises assessing image data from a camera and analyzing the image data.

20. The method in accordance with claim 18 wherein the triggering event comprises inserting the card into the gaming machine.

21. The method of claim 18, wherein the peripheral is a player tracking device.

22. A method of authorizing the use of a card in a gaming machine and collecting security data regarding activities associated with the gaming machine, the method comprising:

in response to a user interacting with a peripheral coupled to a remote location through a communication link, generating first facial image information regarding the person;

storing the first facial image information on a card issued to the person;

reading the first facial image information stored on the card with a second peripheral at a gaming machine located in a casino;

obtaining current facial image information of a person using the card at the gaming machine using an image collection device, wherein the image collection device is physically incorporated with the second peripheral;

comparing the first facial image information stored on the card with the current facial image information of the person using the card at the gaming machine to confirm that the person using the card is the party to whom the card was issued;

obtaining at least one image with the image collection device; and obtaining audio information using a microphone associated with the gaming machine, wherein the at least one image and the audio information are stored in response to a triggering event detected by either the image collection device or the microphone.

23. The method in accordance of claim 22 wherein the image collection device is a camera.

24. The method of claim 22, wherein the triggering event comprises a loud sound or particular spoken words detected by the microphone.

25. The method of claim 22, wherein the triggering event comprises a level of motion represented by the collected images.

26. The method of claim 22, wherein the stored at least one image and audio information are associated with each other.

27. A method of authorizing payout to a user using a gaming machine located in a casino, the method comprising:

in response to a first trigger event occurring prior to or upon initiation of a game on the gaming machine, obtaining first facial image information regarding the user at the gaming machine, wherein the first trigger event is an insertion of a user card into a card reader of a player tracking device associated with the gaming machine, wherein obtaining the first facial image information comprises reading the first facial image information from the user card;

in response to a second trigger event occurring during execution of the game on the gaming machine, obtaining second facial image information of the user at said gaming machine, wherein the second trigger event is a game initiated event, wherein the game initiated event is a game payout event, wherein the second facial image information is obtained using an image collection device physically incorporated with the player tracking device;

comparing said first facial image information with said second facial image information of said user at said gaming machine to confirm that the user using the gaming machine during the first trigger event is the same user using the gaming machine during the second trigger event;

confirming that the first facial image information matches the second facial image information; and upon confirmation, importing player image data on a payout ticket for the user.

28. The method of claim 27, further comprising:

using the player image data to verify the user when the user presents the payout ticket for payment.

* * * * *